US010069959B2

(12) United States Patent
Gerlach et al.

(10) Patent No.: US 10,069,959 B2
(45) Date of Patent: Sep. 4, 2018

(54) METHOD AND INFORMATION SYSTEM FOR INFORMING A DRIVER OF A VEHICLE REGARDING THE AVAILABILITY OF A COMMUNICATION LINK

(71) Applicant: VOLKSWAGEN AG, Wolfsburg (DE)

(72) Inventors: Matthias Gerlach, Potsdam (DE); Jan Titze, Braunschweig (DE)

(73) Assignee: VOLKSWAGEN AG, Wolfsburg (DE)

(*) Notice: Subject to any disclaimer, the term of this patent is extended or adjusted under 35 U.S.C. 154(b) by 0 days.

(21) Appl. No.: 15/163,622

(22) Filed: May 24, 2016

(65) Prior Publication Data

US 2016/0352881 A1 Dec. 1, 2016

(30) Foreign Application Priority Data

May 30, 2015 (DE) ........................ 10 2015 007 115

(51) Int. Cl.

*H04M 3/00* (2006.01)
*H04M 1/725* (2006.01)
*H04W 8/00* (2009.01)
*B60K 37/06* (2006.01)
*H04W 4/021* (2018.01)
*H04W 4/04* (2009.01)

(52) U.S. Cl.

CPC ........... *H04M 1/7253* (2013.01); *B60K 37/06* (2013.01); *H04W 8/005* (2013.01); *H04W 4/021* (2013.01); *H04W 4/046* (2013.01)

(58) Field of Classification Search

None

See application file for complete search history.

(56) References Cited

U.S. PATENT DOCUMENTS

2003/0139179 A1* 7/2003 Fuchs ..................... G07C 5/008 455/426.1
2006/0199612 A1* 9/2006 Beyer, Jr. .......... H04M 1/72547 455/556.2
2013/0252611 A1* 9/2013 Rose ..................... H04W 48/12 455/436
2014/0129092 A1 5/2014 Mori et al.
2014/0379252 A1* 12/2014 Sorokin ............. G01C 21/3461 701/426
2015/0052226 A1* 2/2015 Rude ...................... G07C 5/008 709/219

(Continued)

FOREIGN PATENT DOCUMENTS

KR 20110051513 A 5/2011
KR 20140122956 A 10/2014

OTHER PUBLICATIONS

European Search Report dated Dec. 5, 2016, in counterpart European application No. 16171469.6 (5 pages).

*Primary Examiner* — Shantell L Heiber

(74) *Attorney, Agent, or Firm* — Hunton Andrews Kurth LLP

(57) ABSTRACT

In a method for informing a driver of a vehicle regarding the availability of a communication link of the vehicle to an external communication unit, a first service category and a second service category are provided which utilize the communication link, the availability of the communication link is checked for both service categories, and the result of the availability check is displayed graphically to the vehicle driver in one symbol for both service categories.

11 Claims, 4 Drawing Sheets

(56) References Cited

U.S. PATENT DOCUMENTS

2015/0215739 A1* 7/2015 Lee ...................... A61K 31/167
455/457
2015/0312874 A1* 10/2015 Das ..................... H04W 60/005
455/435.1
2015/0351004 A1* 12/2015 Ko ........................ H04W 4/008
455/411

* cited by examiner

METHOD AND INFORMATION SYSTEM FOR INFORMING A DRIVER OF A VEHICLE REGARDING THE AVAILABILITY OF A COMMUNICATION LINK

CROSS-REFERENCE TO RELATED APPLICATIONS

The present application claims priority to Application No. 10 2015 007 115.7, filed in the Federal Republic of Germany on May 30, 2015, which is expressly incorporated herein in its entirety by reference thereto.

FIELD OF THE INVENTION

The present invention relates to a method and an information system for informing a driver of a vehicle regarding the availability of a communication link, as well as a vehicle and a computer program product.

BACKGROUND INFORMATION

In vehicles such as automobiles, trucks, or even motorcycles, communication capabilities are increasingly being installed that permit various functions. The driver is usually informed via an indicator on the display of a communication unit or a navigation system about the status of the link.

BRIEF SUMMARY OF THE INVENTION

An object of the present invention is to improve the integration of communication links. In the method of the present invention for informing a driver of a vehicle regarding the availability of a communication link of the vehicle to an external communication unit, a first service category and a second service category are provided which utilize the communication link, the availability of the communication link is checked for both service categories, and the result of the availability check is displayed graphically in one symbol for both service categories to the vehicle driver.

The method of the present invention has the advantage that different services and or communication channels may easily be displayed together in one symbol or icon. This permits a compact representation of a complex relationship for a new type of product, so-called colorful (infotainment) and gray (remote) services in a vehicle. The availability of a communication link is understood here to be both the physical connection, such as a radio channel of a telecommunication connection, and a logical connection like, for example, a possibly password-protected access authorization or a functionality to be paid for. Accordingly, the check of the availability may include both components, that is, the physical and the logical connectivity. Since these details are not known or at least at first glance are not relevant for the driver, an information reduction is carried out here, which is able to increase both safety and ease of operation. The information reduction is further improved by displaying the results for both service categories graphically in one symbol.

Two communication links may be provided, the first service category utilizing a first of the two communication links, and the second service category utilizing a second of the two communication links. For example, for organizational reasons or for safety reasons, two or more communication links may be provided in order to separate the service categories from each other. The method is especially suitable for such situations, since several channels may be processed separately from each other, that is, may be checked separately from each other and then displayed together in one symbol.

One of the two communication links may run via a mobile communication unit like, for example, a cell phone or tablet. For reasons of security and because of billing arrangements, personal or personalized additional services, e.g., for the functions navigation or entertainment, in particular may be linked into the vehicle via a cell phone of the driver. To that end, the cell phone is connected via a data connection such as Bluetooth, WLAN or USB to the vehicle, usually a control device of the vehicle. Such a connection may also be tested for availability and the result displayed.

The first service category may provide infotainment functions. This includes, for example, typical Internet functions such as browsing, optional image representations in the navigation system or personal navigation points (POI, points of interest). In the symbol or icon for displaying the availability of the first service category, accordingly, the letter I may be used which, for example, is shown fully or in color in the case of availability, or is grayed out or faded out if there is no availability. Typically, such infotainment functions originate with the user or driver of the vehicle, thus, are usually started inside the vehicle.

The second service category may provide remote functions. For the most part, these include services which are controlled from outside via the cell phone of the driver like, for example, checking the tank capacity, remote battery charging (remote control of the state of charge in the case of a hybrid or electric-powered vehicle), geo-fencing (establishing a virtual fence or area), and so forth. In the symbol or icon for displaying the availability of the second service category, accordingly, the letter R may be used which, for example, is shown fully or in color in the case of availability, or is grayed out or faded out if there is no availability. Typically, such remote functions originate with the user or driver outside of the vehicle, thus, are usually started externally of the vehicle. The display of the availability of this service or this service category in the vehicle allows the driver a preview as to whether these services will be available upon leaving the vehicle.

The first service category may be initiated from inside the vehicle and the second service category may be initiated from outside the vehicle. Therefore, all possibilities of setting up a connection are included and displayed in one symbol. Thus, a complete coverage of the services is given. A pictorial representation may include an outgoing arrow for services initiated from inside the vehicle and an incoming arrow for services initiated from outside the vehicle.

The information system according to the present invention for a vehicle to inform a driver of a vehicle regarding the availability of a communication link of the vehicle to an external communication unit for a first service category and a second service category includes units which are designed to carry out the steps of the method described above. The same advantages and modifications hold true as previously described.

A touch-sensitive display may be provided, which is set up to graphically represent the result of the availability check in the form of a symbol, and in response to the symbol being touched, to display further information regarding the communication link and/or the service categories. When necessary, the reduction in detail may thereby be undone again, and details concerning the links, services, or their availabilities may be indicated. For example, when a link, a service category and/or an individual service of a service category is not available, the reason may be displayed in detail.

A display of an infotainment system and a control device may be provided for carrying out the method described above. Thus, already-existing components may be used, which simplifies the implementation of the method.

The vehicle according to the present invention includes an information system as previously described. The same advantages and modifications hold true as described above.

The computer program product of the present invention includes program code for carrying out the method described above, when the program product is executed on a device or an information system. The same advantages and modifications hold true as previously described.

DETAILED DESCRIPTION OF THE INVENTION

Figure 1:
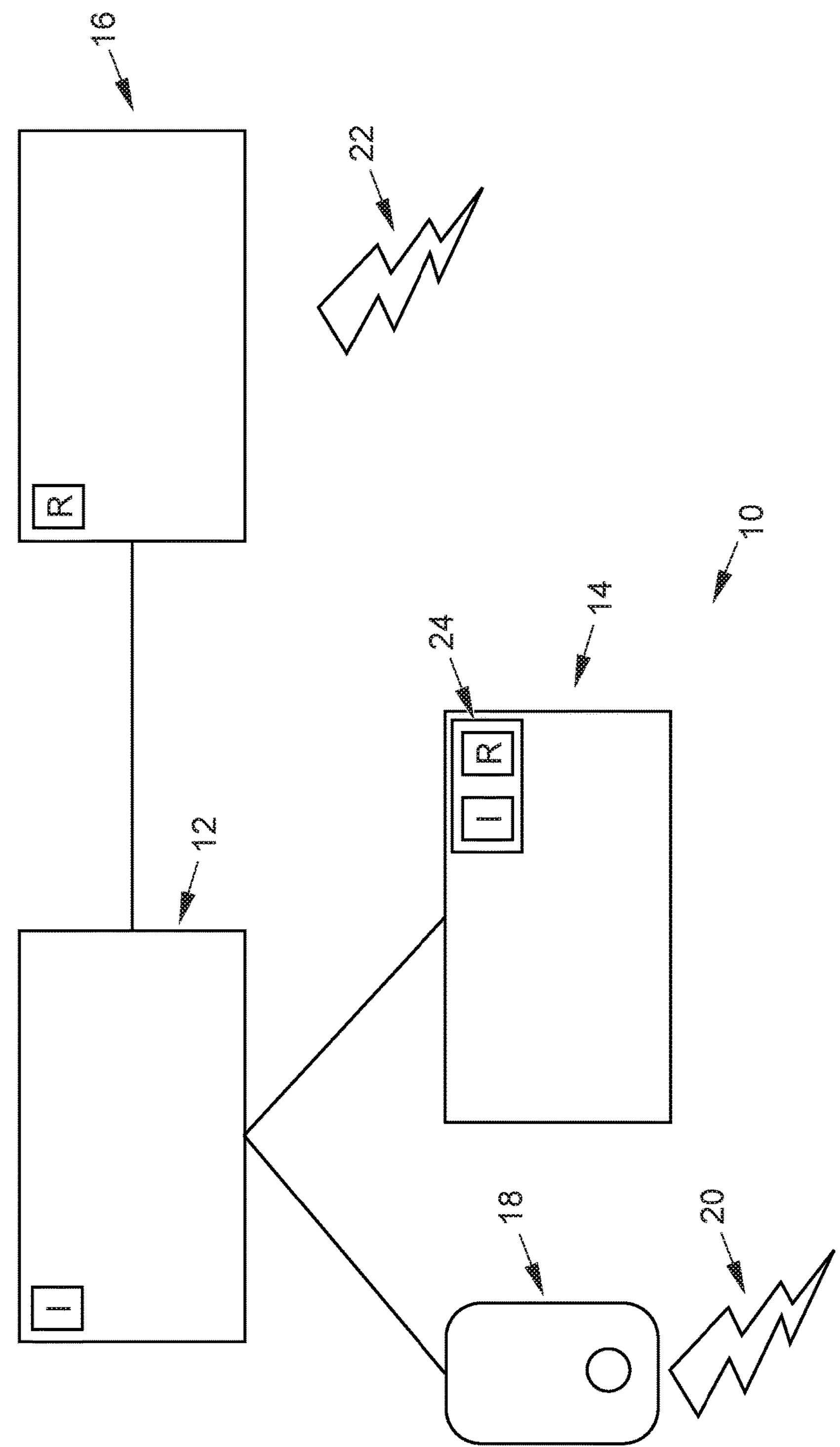
FIG. 1 shows a block diagram of an information system according to a first exemplary embodiment of the invention.

FIG. 1 shows an information system 10 for a vehicle. Information system 10 includes a control device 12, also called head unit, for infotainment functions or services. These functions include, inter alia, navigation services and audio and/or video playback. Control device 12 may also be an isolated control device for one of the functions, e.g., navigation.

Furthermore, a display 14 is provided, which communicates with control device 12 in order to show data from control device 12 on display 14. For example, display 14 displays navigation data, audio data and/or information regarding the vehicle. Display 14 may be touch-sensitive or proximity-sensitive, so that inputs may also be carried out via display 14. Display 14 and control device 12 may be one unit.

A telematic control device 16 is connected to control device 12, e.g., via a bus system such as CAN. A communication protocol such as, for example, BAP (operation-display protocol) is installed on it that permits the exchange of data between the two devices. Telematic control device 16 is responsible for telematic functions such as remote services, for instance. Remote services presume that the vehicle is reachable, and are initiated, for example, from a cell phone outside of the vehicle. For instance, such remote services include remote battery charging or geo-fencing-virtual fence.

The definition of a virtual boundary and the automated triggering of an action owing to the crossing of the boundary on the earth's surface are identified with geo-fencing. In most cases, the boundary defines an enclosed area, so that it is possible to differentiate between inside and outside. For instance, upon entering into the area or upon leaving the area, a notification may be triggered. To that end, the object observed must transmit its position at regular intervals, or must permit the request of its information from outside. This position fixing may be carried out via the cellular radio system on the radio-cell level or via a navigation satellite system based on coordinates. For example, this allows the monitoring of the operating area of vehicles, e.g., of a company fleet or of rental cars. In the case of rental cars, with the aid of geo-fencing, it is ensured that the vehicles are only used within the country.

Functions or data of telematic control device 16 are also displayable on display 14.

A mobile communication unit 18 of the driver or of a passenger is located within the vehicle and communicates with control device 12. To that end, for example, the two units are connected to each other via WLAN, USB or Bluetooth. Mobile communication unit 18, e.g., a smart phone or tablet, creates a gateway or a first communication link 20 for data exchange between the vehicle, such as an infotainment or navigation system of the vehicle, and an external communication unit like a web server, for instance.

A first service category is implemented or made available via first communication link 20. The first service category is referred to here as infotainment, and furnishes infotainment services or functions such as a typical internet usage with internet browsing, Street View and personal POIs, for example. Infotainment services are typically triggered or initiated from the vehicle, that is, internal to the vehicle.

Via a second communication link 22, the vehicle, or rather telematic control device 16, is connected to a further external communication unit such as the back end of the vehicle manufacturer, for example. A second service category is implemented or made available via second communication link 22. The second service category is referred to here as remote, and provides remote services or functions. Remote services are typically triggered or initiated from outside the vehicle, that is, external to the vehicle. This initiating may be accomplished through the smart phone of the driver or through the back end.

The two service categories use different communication links 20, 22 having different physical channels and logical properties or protocols. Availability of the respective link is necessary in order to use the services. To indicate the status of the two communication links 20, 22 to the driver, first of all, both availabilities are checked. In addition to the purely physical connection check, this also includes a logical connection check, for example, access authorizations, passwords, the existence of connection quotas and the like.

The result of the check is displayed to the driver in a single symbol or icon 24 on display 14. Often, the driver is not aware of or familiar with the different communication links 20, 22, so that the display of inherently separate communication links 20, 22 in one symbol reduces the complexity for the driver. In addition, reducing the information relieves the driver of stress, since only the result of two complex link checks is displayed in one symbol. For example, the display may be implemented by the letters I (infotainment services) and R (remote services). A full or displayed letter may then indicate availability, while a grayed-out or not fully displayed letter indicates no availability.

Figure 2:
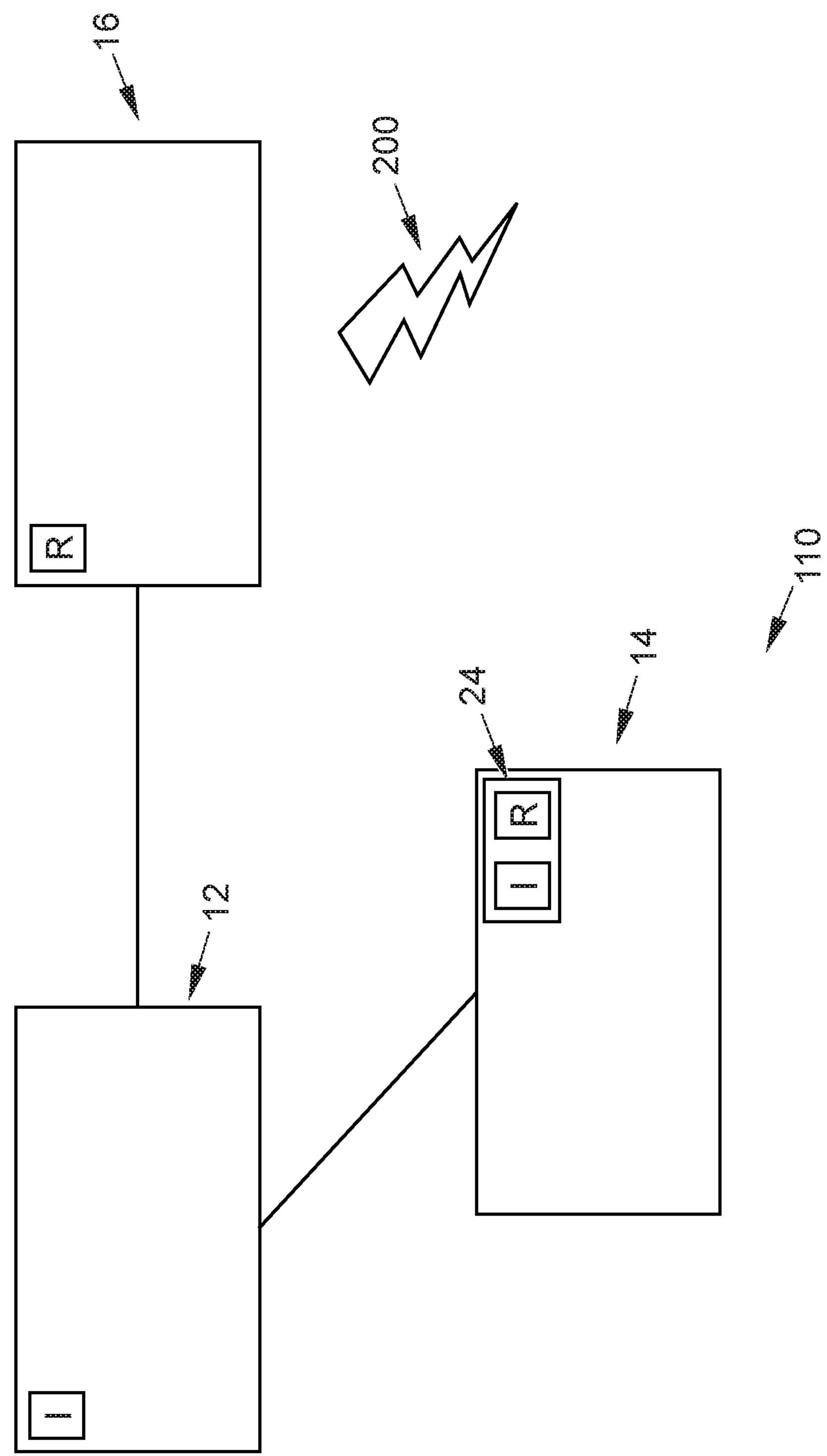
FIG. 2 shows a block diagram of an information system according to a second exemplary embodiment of the invention.

FIG. 2 shows a further exemplary embodiment of an information system 110, which in design resembles information system 10 from FIG. 1. Here, first and second communication links 20 and 22 are combined in one communication link 200. Communication link 200 originates from telematic control device 16. Both service categories I, R use shared communication link 200 here. In this case, data from or to control device 12 is transmitted via telematic control device 16. The term shared communication link 200 here means mainly the identical communication endpoint at the vehicle. The other communication endpoints may be different, for example, back end and web server. The availability of both service categories, or rather their complete communication links, must be checked correspondingly in the case of this exemplary embodiment, as well.

Figure 3:
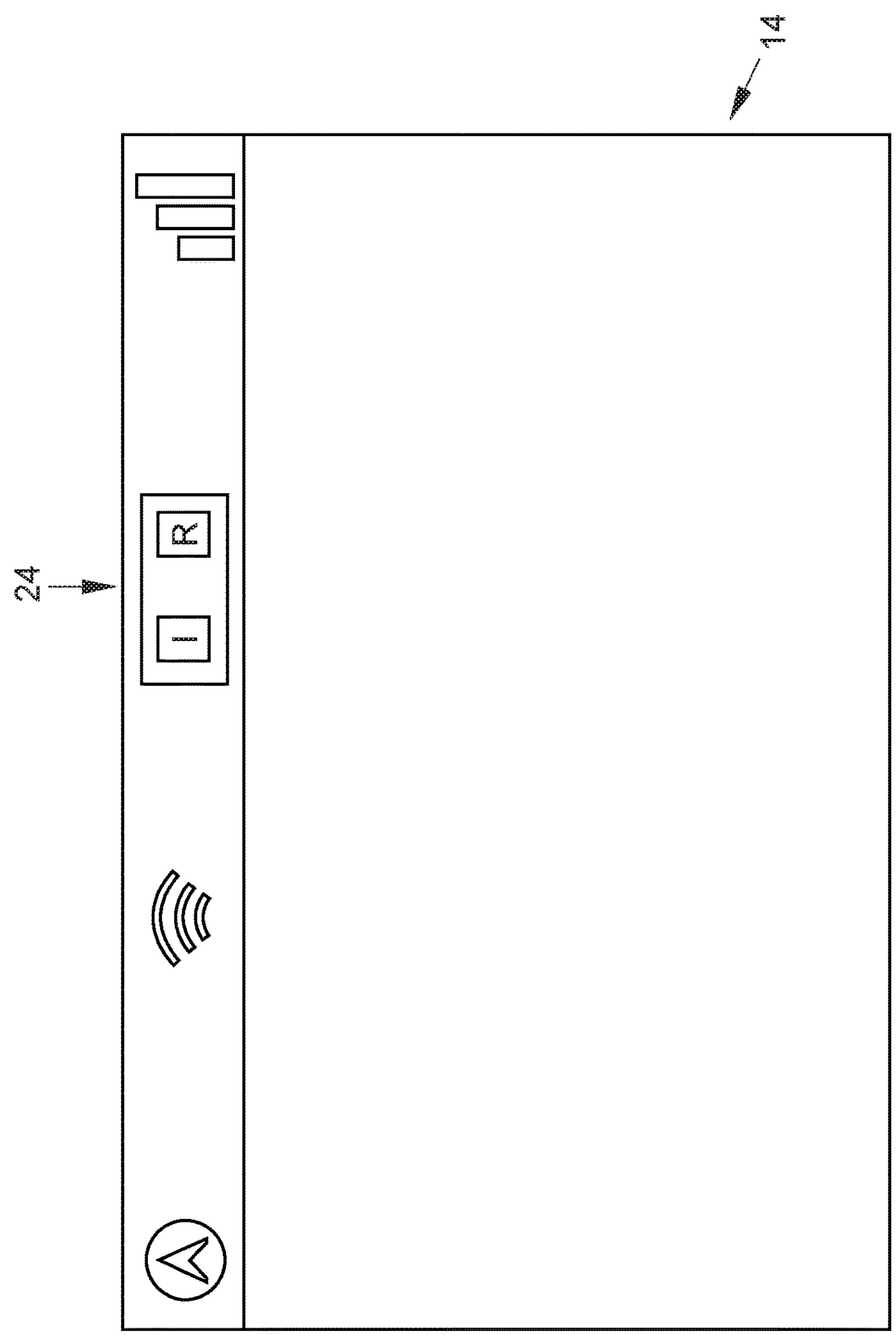
FIG. 3 shows an exemplary representation of a display of an information device.

FIG. 3 shows, by way of example, a screen display of display 14. Symbol 24 for representing the results of the two availability checks for the two service categories I, R, or rather their communication links, is shown in an upper status bar. Thus, the driver is able to discern the status of the service availability at a glance. In response to activation of the symbol, a menu or an information unit having detailed information with regard to the services and/or their availability may be opened.

Figure 4:
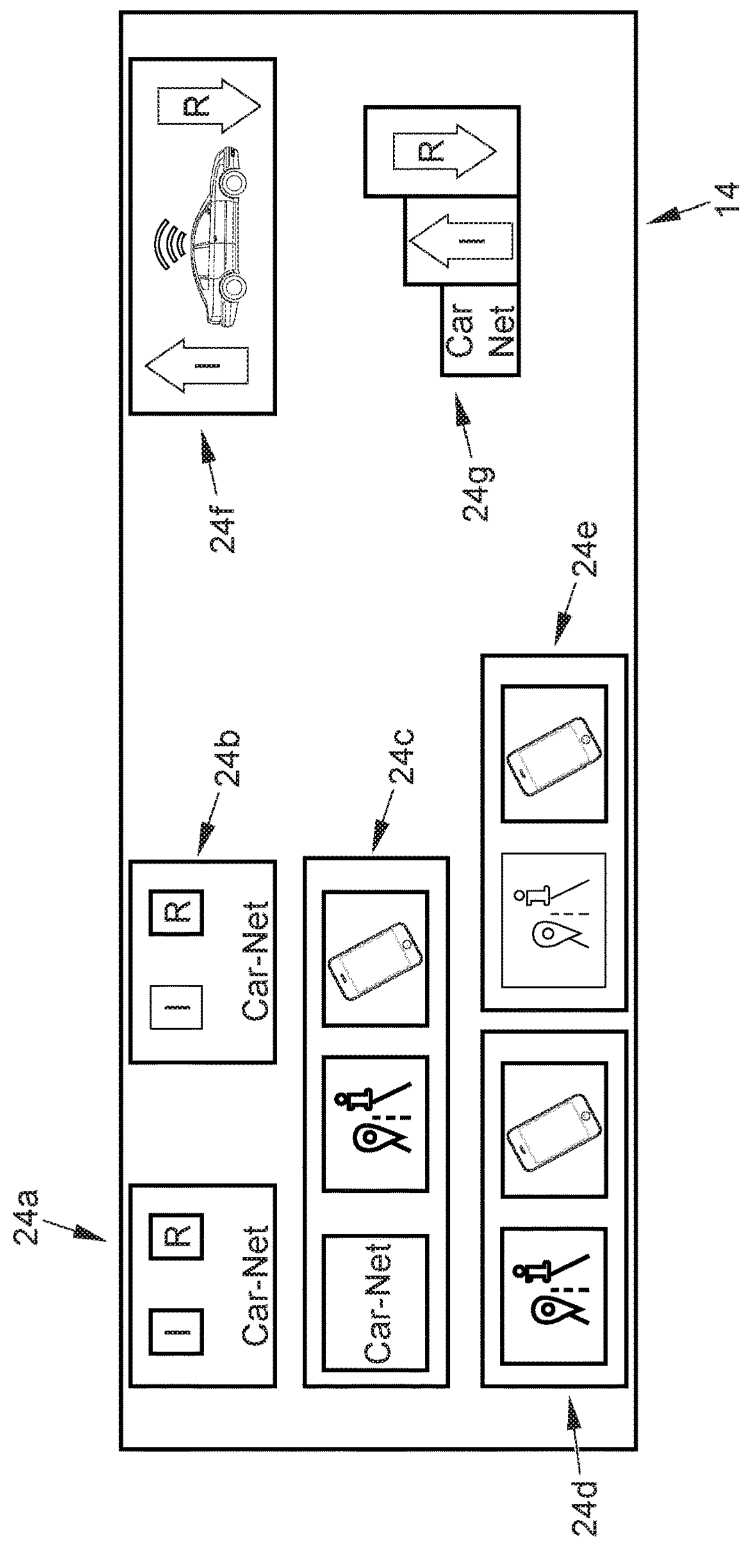
FIG. 4 shows exemplary representations of an icon for displaying the result of the availability check.

FIG. 4 shows, illustratively, a plurality of examples of the symbol 24 for display in display 14. Symbol or icon 24*a* indicates the availability of both services I, R, while symbol 24*b* indicates the availability of service R and the non-availability of service I. In addition, the overall system in which the two service categories are provided is identified by lettering, e.g., Car-Net, in this example.

Symbol 24*c* shows a further exemplary representation of the availability of both services, as well as the name of the overall system. The middle street-like representation symbolizes service category I. The right representation of a stylized cell phone symbolizes service category R.

Symbols 24*d* and 24*e* show further representations, both service categories I and R being available according to symbol 24*d*, while according to symbol 24*e*, only service category R is available.

Symbol 24*f*, as an outgoing arrow, symbolizes service category I being available. The outgoing arrow is selected, since connections of the service category "infotainment" originate within the vehicle. Symbol 24*f*, as incoming arrow, symbolizes service category R available here. The incoming arrow is selected, since connections of the service category "remote" originate outside of the vehicle. The terms incoming and outgoing relate to the vehicle which, for the purpose of illustration, is located between the two arrows.

Symbol 24*g* shows a further representation of the availability of both service categories I and R in a single symbol. Both service categories are available here, which is indicated by the fact that neither arrow is grayed out, but rather both are shown in full color.

What is claimed is:

1. A method for informing a driver of a vehicle regarding the availability of at least one communication link of the vehicle to an external communication unit, wherein a first service category and a second service category are provided which utilize the at least one communication link, the method comprising:

checking, by a controller, the availability of the at least one communication link for both the first and second service categories;

graphically displaying, by a touch sensitive display device, to the vehicle driver the result of the availability check in one symbol for both the first and second service categories; and in response to the symbol being touched, displaying on the display device, further information regarding at least one of the at least one communication link, the first service category and the second service category;

wherein the first service category comprises services initiated at the vehicle, and the second service category comprises services initiated remote from the vehicle.

2. The method as recited in claim 1, wherein two communication links are provided, the first service category utilizing a first of the two communication links, and the second service category utilizing a second of the two communication links.

3. The method as recited in claim 2, wherein one of the two communication links is provided via a mobile communication unit.

4. The method as recited in claim 2, wherein the first service category provides infotainment functions.

5. The method as recited in claim 4, wherein the second service category provides remote functions.

6. The method as recited in claim 4, wherein the first service category provides infotainment functions including at least one of internet browsing or image representations in the navigation system, and personal navigation points.

7. The method as recited in claim 4, wherein the second service category provides remote functions including at least one of checking a tank capacity, remotely charging a battery, geo-fencing, and communicating with a vehicle manufacturer.

8. The method as recited in claim 2, wherein at least one of the two communication links is provided via a telematic control device.

9. An information system for a vehicle, the information system being configured to inform a driver of the vehicle regarding the availability of at least one communication link of the vehicle to an external communication unit, wherein a first service category and a second service category are provided which utilize the at least one communication link, the information system comprising:

a controller checking the availability of the at least one communication link for both the first and second service categories; and a display device graphically displaying to the vehicle driver the result of the availability check in the form of one symbol for both the first and second service categories; wherein the display device is a touch-sensitive display configured to (i) graphically represent the result of the availability check in the form of one symbol, and (ii) in response to the symbol being touched, to display further information regarding at least one of the at least one communication link, the first service category and the second service category;

wherein the first service category comprises services initiated at the vehicle, and the second service category comprises services initiated remote from the vehicle.

10. The information system as recited in claim 9, wherein the display device is part of an infotainment system.

11. A non-transitory, computer-readable data storage medium storing a computer program having program codes which, when executed on a computer, perform a method for informing a driver of a vehicle regarding the availability of at least one communication link of the vehicle to an external communication unit, wherein a first service category and a second service category are provided which utilize the at least one communication link, the method comprising:

checking, by a controller, the availability of the at least one communication link for both the first and second service categories; and graphically displaying, by a touch sensitive display device, to the vehicle driver the result of the availability check in one symbol for both the first and second service categories; and in response to the symbol being touched, displaying on the display device, further information regarding at least one of the at least one communication link, the first service category, and the second service category;

wherein the first service category comprises services initiated at the vehicle, and the second service category comprises services initiated remote from the vehicle.

* * * * *